(12) United States Patent
Holden

(10) Patent No.: US 11,423,435 B2
(45) Date of Patent: Aug. 23, 2022

(54) ADVERTISEMENT FEEDBACK AND CUSTOMIZATION

(71) Applicant: Comcast Cable Communications, LLC, Philadelphia, PA (US)

(72) Inventor: Dan Holden, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/796,291

(22) Filed: Mar. 12, 2013

(65) Prior Publication Data

US 2014/0278920 A1 Sep. 18, 2014

(51) Int. Cl.
*G06Q 30/02* (2012.01)
(52) U.S. Cl.
CPC .............. *G06Q 30/0245* (2013.01)
(58) Field of Classification Search
CPC .......... G06Q 30/0245; G06Q 30/0277; G06Q 30/02; G06Q 30/0214; G06Q 30/0241; G06Q 30/0251; G06Q 30/0272
USPC .......... 705/14.4, 14.41, 14.42, 14.43, 14.44, 705/14.49, 14.68, 14.64, 14.6
See application file for complete search history.

(56) References Cited

U.S. PATENT DOCUMENTS

| | | | | | |
|---|---|---|---|---|---|
| 2005/0147247 | A1* | 7/2005 | Westberg | ........... | H04N 21/4122 380/200 |
| 2006/0026655 | A1* | 2/2006 | Perez | ..................... | G06Q 30/02 725/91 |
| 2009/0292608 | A1* | 11/2009 | Polachek | ........... | G06Q 30/0245 705/14.44 |
| 2010/0161424 | A1* | 6/2010 | Sylvain | .............. | G06Q 30/0621 705/14.66 |
| 2010/0222043 | A1* | 9/2010 | Dragt | ..................... | G06Q 30/02 455/414.3 |
| 2010/0251289 | A1* | 9/2010 | Agarwal | .................. | H04N 7/16 725/34 |

(Continued)

OTHER PUBLICATIONS

Woodill, Gary, "Using Mobile Devices as Research Tools", Mar. 4, 2012, https://gowithfloat.com/2012/03/using-mobile-devices-as-research-tools/ (Year: 2012).*

*Primary Examiner* — Sam Refai
*Assistant Examiner* — Kyle G Robinson
(74) *Attorney, Agent, or Firm* — Banner & Witcoff, Ltd.

(57) ABSTRACT

Advertisement user feedback data may be collected and provided to an advertisement decision engine. Advertisements may be presented to users via various electronic media such as digital television, Internet, software, etc., and advertisement feedback user interfaces may be provided to users in connection with such advertisements. An advertisement feedback user interface may be provided via the same electronic medium and device as the corresponding advertisements, or via a different electronic medium and/or device. User feedback data regarding electronic advertisements, as well as additional related data, may be received and provided to one or more advertisement decision engines. An advertisement decision engine may use the advertisement user feedback data to determine a future advertisement to be presented to one or more users at an advertisement insertion opportunity identified in one or more various electronic media.

66 Claims, 6 Drawing Sheets

(56) References Cited

U.S. PATENT DOCUMENTS

| | | | | |
|---|---|---|---|---|
| 2010/0274624 A1* | 10/2010 | Rochford | ............... | G06Q 30/02 |
| | | | | 705/14.41 |
| 2011/0078001 A1* | 3/2011 | Archer | ................... | G06Q 30/02 |
| | | | | 705/14.2 |
| 2011/0102600 A1* | 5/2011 | Todd | .................... | H04N 17/004 |
| | | | | 348/180 |
| 2012/0311625 A1* | 12/2012 | Nandi | .............. | H04N 21/23418 |
| | | | | 725/28 |
| 2012/0317123 A1* | 12/2012 | Green | ............... | G06F 17/30867 |
| | | | | 707/748 |
| 2012/0324494 A1* | 12/2012 | Burger | ................... | H04H 60/33 |
| | | | | 725/12 |
| 2015/0206172 A1* | 7/2015 | Lefevre | ............ | H04N 21/23424 |
| | | | | 705/14.41 |
| 2017/0249664 A1* | 8/2017 | Harik | ................ | G06Q 30/0254 |

\* cited by examiner

ADVERTISEMENT FEEDBACK AND CUSTOMIZATION

BACKGROUND

Advertisers in many industries have long sought to target their advertisements to the individuals and groups that are most likely to purchase the products or services advertised. These advertisers may use demographic information to estimate as to where they should place their advertisements (e.g., beer companies guess that viewers of American football games consume beer), but such estimation is imperfect, and advertisements are inevitably presented to some users who simply are not interested in the advertised product. There remains an ever-present need for improved methods of delivering advertising to the relevant users.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, advertisement user feedback data may be collected and provided to an advertisement decision engine. Electronic advertisements may be presented to users via various transmission media, such as a digital video multicast or broadcasts, video-on-demand, Internet web sites, or other software applications. In some examples, an advertisement feedback user interface may be provided to one or more users in connection with an electronic advertisement. The advertisement feedback user interface may be provided via the same electronic medium and same device on which the advertisement is presented to the user, or may be provided via a different electronic medium and/or different device. User feedback data regarding the electronic advertisement may be received via the advertisement feedback user interface. The user feedback data and additional related data, such as advertisement presentation time data, device data, medium data, and data identifying the user, may be stored and provided to an advertisement decision engine.

According to additional aspects, an advertisement decision engine, such as a computing device within an information distribution network, or an external device in communication with such a network, may receive advertisement user feedback data and use the data to determine an advertisement to be presented to one or more users. An advertisement insertion opportunity for one or more users may be identified, for example, within a digital broadcast transmission stream, video-on-demand program, or Internet content requested by a user via a computing device. Advertisement user feedback data corresponding to previous advertisements presented to users may be retrieved, and an advertisement may be determined for the advertisement insertion opportunity based on the user feedback data.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will by one of skill in the art upon reading the following disclosure, various aspects described herein may be appreciated embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
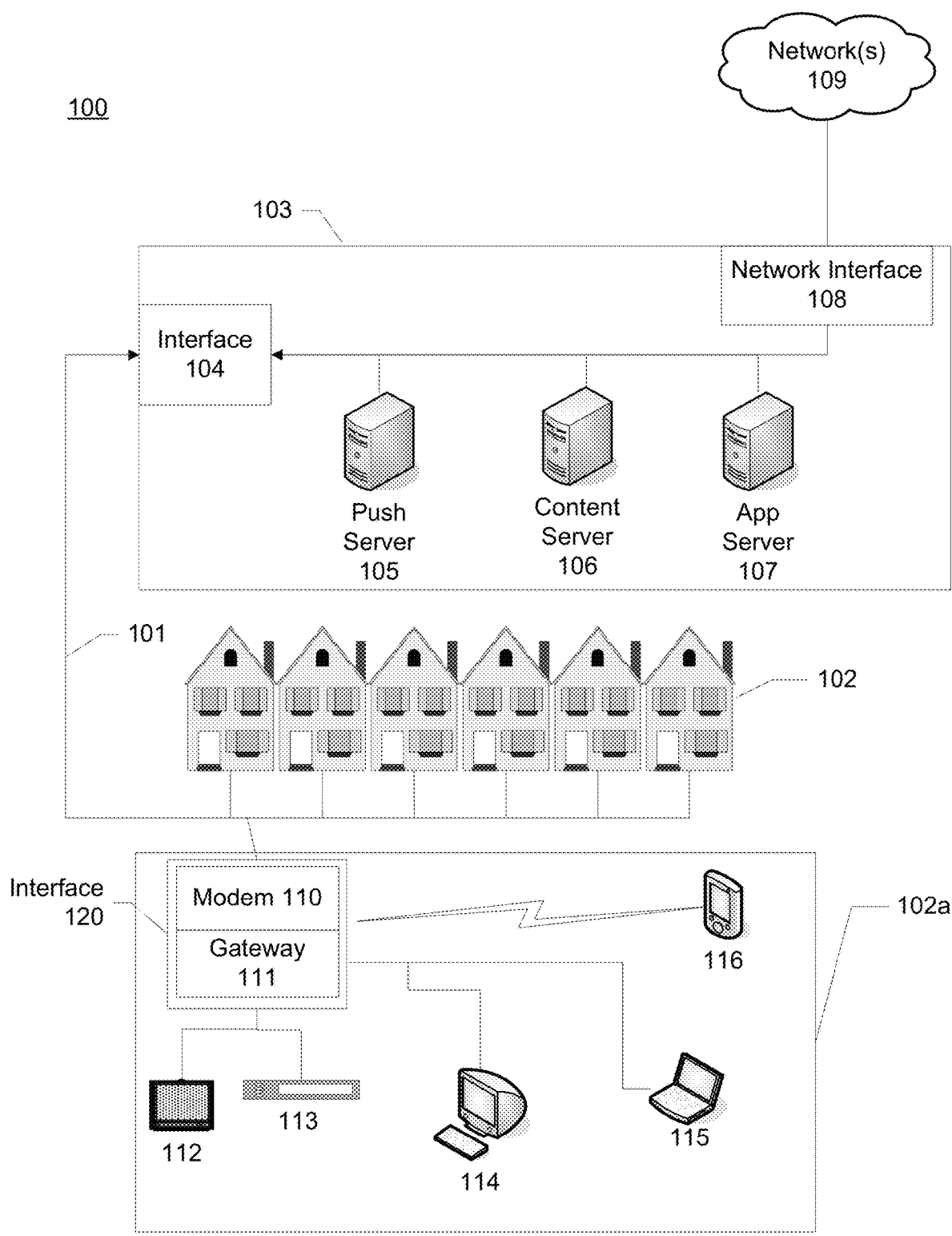
FIG. 1 illustrates an example system in which various features discussed herein may be implemented.

FIG. 1 illustrates an example information distribution network 100 on which various features described herein may be implemented. Network 100 may be any type of information (or content) distribution network, such as a satellite network, a telephone network, a cellular network, a wireless network, and/or combinations thereof. For example, network 100 may be an optical fiber network, a coaxial cable network, or a hybrid fiber/coax (HFC) distribution network. Such a network 100 may use a series of interconnected communication links 101 (e.g., coaxial cables, optical fibers, wireless connections, etc.) to connect multiple premises 102 (e.g., businesses, homes, consumer dwellings, etc.) to a local office 103 (e.g., a headend, a central office, a processing facility, etc.). The local office 103 may transmit downstream information signals onto the links 101, and each premises 102 may have a receiver that can be used to receive and process those signals. The geographic location of the local office 103 can vary, and the local office 103 may be proximate to a user's neighborhood in some embodiments, while in other embodiments, the local office 103 may be located remotely at a centralized location. The various servers can be located anywhere, and their location might not be relevant to a user (e.g., the servers may be in the "cloud").

In some arrangements, there may be one link 101 originating from the local office 103, and it may be split a number of times to distribute the signal to various premises 102 in the vicinity (which may be many miles) of the local office 103. The links 101 may include components that are not illustrated, such as splitters, filters, amplifiers, etc., to help convey the signal clearly. Some portions of the links 101 also may be implemented with fiber-optic cable, while other portions may be implemented with coaxial cable, other lines, or wireless communication paths.

The local office 103 may include an interface 104, such as a termination system (TS) or a cable modem termination system (CMTS) in an example of an HFC-type network, which may be a computing device that is configured to manage communications between devices on the network of links 101 and backend devices, such as servers 105, 106, and 107 (which are discussed further below). In the example of an HFC-type network, the TS may be as specified in a standard, such as the Data Over Cable Service Interface Specification (DOCSIS), published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks, Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to communicate with other devices on the network, such as a cellular telephone network and its corresponding cell phones. Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions, such as billing, reporting, and subscriber management to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users, who may be, for example, in the premises 102 (e.g., homes). In some embodiments, the content server 106 may include software to validate (or initiate the validation of) user identities and entitlements, locate and retrieve (or initiate the location and retrieval of) requested content, encrypt the content, and initiate delivery (e.g., streaming, transmitting via a series of content fragments) of the content to the requesting user and/or device. Other server computing devices may be present as well. Also, the various servers and elements are depicted in a local office 103, but they need not be co-located in a common premises, and instead may have some or all elements located remotely in the networks 109.

The local office 103 also may communicate with one or more application servers 107 maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server 107 may be responsible for collecting television program listings information and generating a data download for electronic program guide listings. Another application server 107 may be responsible for monitoring user viewing habits and collecting that information for use in selecting advertisements. As discussed below, another application server may be responsible for formatting and inserting advertisements in a video stream and/or content item being transmitted to the premises 102.

An example premises 102a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the premises 102a to communicate with the local office 103 and other devices beyond the local office. The gateway 111 may be a set-top box (STB), digital video recorder (DVR), gaming console, computer server, or any other desired computing device. The gateway 111 may also include local network interfaces (not shown) that can provide communication signals to other devices in the premises 102a (e.g., user devices), such as televisions 112, additional STBs 113, personal computers 114, laptop or tablet computers 115, wireless devices 116 (wireless laptops and networks, mobile phones, mobile televisions, PDAs, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 4G, WiMAX, LTE, Bluetooth interfaces, and others. In some embodiments, the system may use ZigBee and Z-Wave compliant devices.

Figure 2:
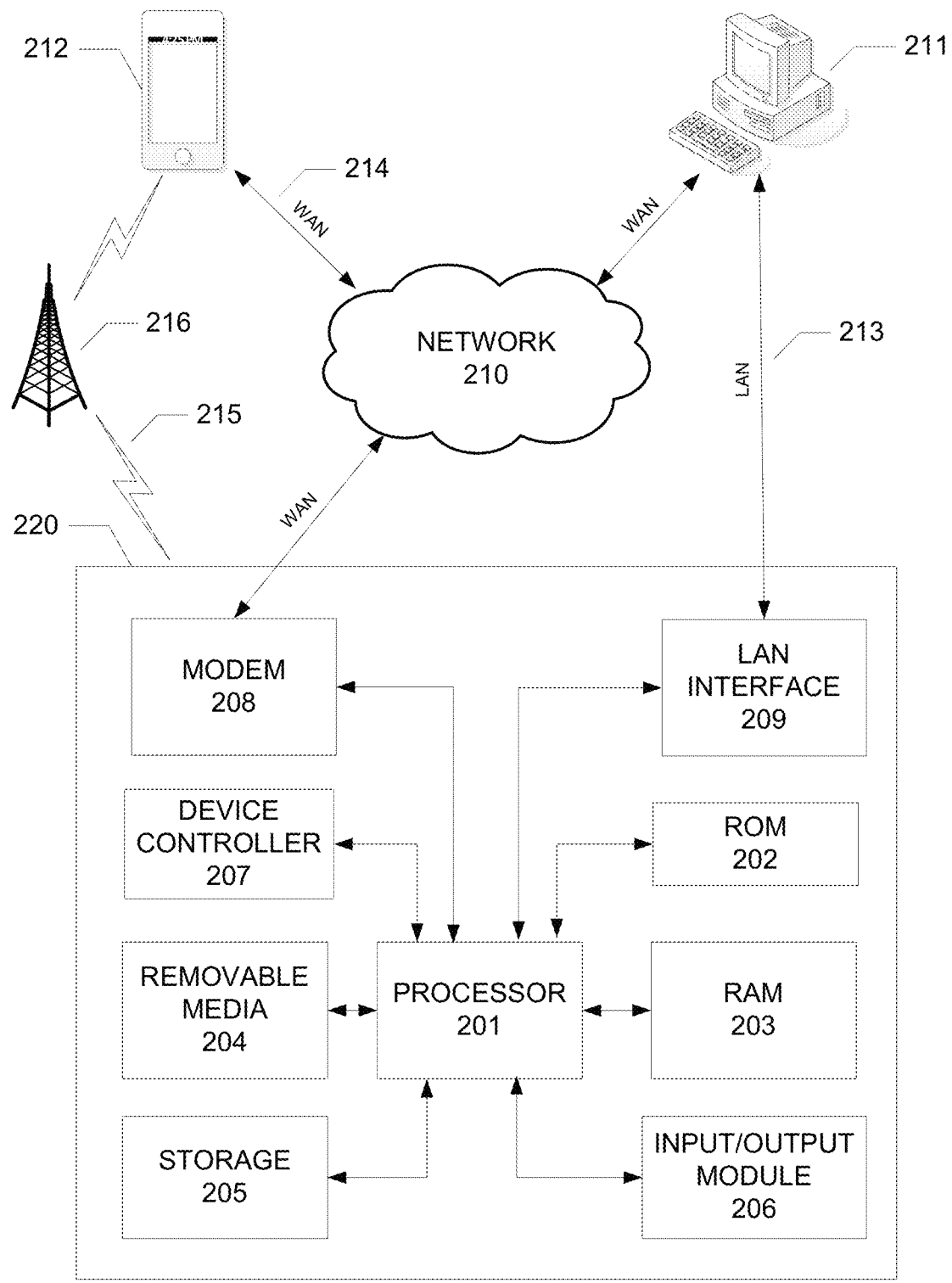
FIG. 2 illustrates an example computing device and network environment that may be used to implement one or more aspects of the disclosure.

FIG. 2 illustrates another example of an information distribution network environment 200, and a set of general hardware elements that may be used to implement various features of advertisement feedback and customization systems and devices discussed herein. The computing device 220 (e.g., an advertisement user feedback device, advertisement customization device, etc.) may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 220 may include one or more input and/or output devices 206, such as a remote control, keyboard, mouse, touch screen, microphone, camera, and a display (or an external television), and may include one or more output device controllers 207, such as a video processor. The computing device 220 may also include one or more network interfaces 208-209, such as input/output circuits (such as a network card) to communicate with one or more external networks 210. The network interfaces 208-209 may be a wired interface, wireless interface, or a combination of the two. In some embodiments, the network interfaces may include a local area network (LAN) interface 209 and/or modem 208 (e.g., a cable modem) for communicating with the Internet 210 and/or one or more other computing devices 211-212 over a LAN or wide area network (WAN). In some embodiments, the network 210 may include the communication lines 101 discussed above, the external network 210, an in-home network, a provider's wireless, coaxial, fiber, or hybrid fiber/coaxial distribution system (e.g., a DOCSIS network), or any other desired network.

The advertisement feedback device and/or advertisement customization device 220 may operate in the networked environment 200 supporting connections to one or more remote computers, such as devices 211 and 212. For example, device 220 may be a web server configured to provide Internet content to client computing devices 211 and 212. Computing devices 211 and 212 may be, for example, personal computers or mobile communication devices, and may include some or all of the elements described above with respect to the computing device 220. The network connections depicted in FIG. 2 include a local area network (LAN) 213 and a wide area network (WAN) 214, and a wireless telecommunications network 215, but may also include other networks. When used in a LAN networking environment, the computing device 220 may be connected to the LAN 213 through a network interface or adapter 209. When used in a WAN networking environment, the computing device 220 may include a modem 208 or other means for establishing communications over the WAN 214, such as network 210 (e.g., the Internet). When used in a wireless telecommunications network 215, the system 101 may include one or more transceivers, digital signal processors, and additional circuitry and software for communicating with wireless computing devices 212 (e.g., mobile phones) via one or more network devices 216 (e.g., base transceiver stations) within the wireless network 215.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and system components described herein may be configured to communicate using any of these network protocols or technologies.

FIG. 2 shows an example hardware configuration. Modifications may be made to add, remove, combine, divide, etc., components as desired, and some or all of the elements may be implemented using software. Additionally, the components illustrated may be implemented using basic computing devices and components, and the same components (e.g., processor 201, ROM 202, user input/output devices 206, etc.) may be used to implement any of the other computing devices and components described herein. For example, the various components herein may be implemented using computing devices having components such as a processor executing computer-executable instructions stored on a computer-readable medium (e.g., storage 205), as illustrated in FIG. 2.

Having described examples of network environments and computing devices that may be used in implementing various aspects of the disclosure, several examples illustrating how advertisements may be presented, advertisement user feedback may be collected, and advertisements may be customized based on user feedback collected from previous advertisements, will now be described in greater detail. The feedback may be any input received in response to an advertisement presented to a user, such as indications from the user of an advertisement's effectiveness, an advertisement rating, and requests from the user that an advertisement should or should not be presented in the future to the user. User feedback may take the form of numeric ratings, simple binary ratings (e.g., Like/Dislike), graded ratings (e.g., scale of 1 to 10), text or verbal feedback, answers to specific questions regarding an advertisement, etc. In other examples, a channel change or "fast forward" button pressed by a user on a remote control device may be detected and classified as a negative rating for the specific advertisement, type of advertisement, product, or product line, while pressing a "rewind" or "go back" button (or other designated remote control buttons) may be detected and classified as a positive rating. Customization may include a determination (or selection) of an advertisement to be presented to a user based on user feedback regarding previously presented advertisements.

Figure 3:
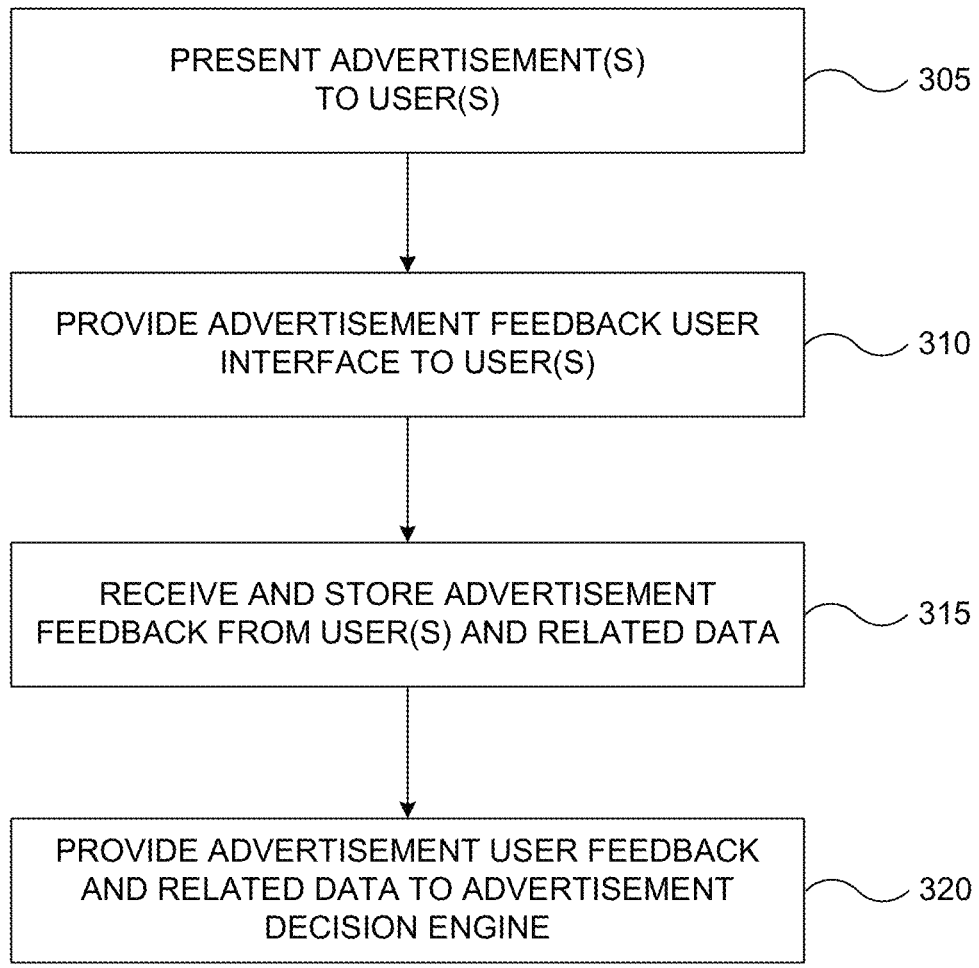
FIG. 3 is a flow diagram illustrating an example advertisement user feedback collection process, according to one or more aspects of the disclosure.

Referring now to FIG. 3, a flow diagram is shown illustrating an example process of advertisement user feedback collection according to various aspects of the disclosure. In step 305, an advertisement may be presented to one or more users via an electronic medium. Electronic advertisements may be provided by any of a variety of computing devices, over an electronic media/network, to one or more user devices. For example, the electronic advertisement in step 305 may be provided by an advertisement engine at a cable headend computing device (e.g., content server 106). The advertisement may be received by and presented on a variety of different types of user devices, such as televisions and set-top boxes, personal computers (e.g., desktop, laptop, and tablet computers, etc.), and mobile devices (e.g., mobile phones, tablet computers, etc.), using various different transmission networks and electronic media (e.g., cable, Internet, wireless, etc.). As an example, the advertisement in step 305 may be a television commercial transmitted by a server 106 at a local or central office 103, over a cable network 101 (e.g., coaxial cables, optical fibers, etc.), and may be presented using a set-top box (STB) 113 and television 112 within a television broadcast or video-on-demand (VOD) program. In other examples, the advertisement may be an Internet advertisement (e.g., pop-up ad, banner ad, hover ad, etc.) transmitted by a web server 220 to a PC 211 or mobile device 212 and presented by a browser application during a web browsing session. Other advertisements may be retrieved and presented to users by software applications executing at STBs and televisions, PCs, mobile devices, or other electronic devices. For instance, mobile applications executing on mobile phones and other devices may be programmed to present advertisements to users periodically while users are interacting with the application.

In some examples, although an advertisement may be directed by a content provider or advertisement decision engine to certain user devices at certain times, the advertisement in fact may be presented to the users on different user devices and/or at different times. For instance, an advertisement may be transmitted from a server 106 to a user during a video multicast transmission or broadcast, but may be stored locally by a user device (e.g., STB 113 or PC 114) and might not be viewed until sometime after the ad was originally transmitted. Users also may employ additional devices to reroute content over different networks to and from different user devices, for example, by routing incoming web-based content received from a web server 220 to the user's television 112 rather than to a PC 114, or rerouting a cable television multicast received from a cable provider 103 over a wireless network 215 to the user's mobile device 212.

Advertisements presented in step 305 may be customized for one or more specific users, or may be general advertisements that are transmitted to many different users. During a video multicast transmission, a content server 106 at a central or local office 103 may detect an upcoming advertisement insertion opportunity within a broadcast or multicast stream. After detecting the upcoming opportunity, the server 106 may select a commercial for insertion that will be transmitted to all users viewing the program. Alternatively, one or more content servers 106 at various local or regional offices 103 may select different commercials, so that viewers in different geographic regions will receive different commercials at the same point during the broadcast. Other television commercial selections may be customized for a specific user (or group of users) according to user demographics and other information available to the advertisement engine. For example, a content server 106 may select a commercial for insertion into the broadcast stream for all users matching specific demographics or other criteria (e.g., based on age, geographic location, climate, television viewing habits, political affiliation, etc.), or for all users known to have purchased a specific product or service. For instance, if a specific user or set of users is known to have recently purchased a new home, a new vehicle, or recently become married or had a child (e.g., based on customer survey data, etc.), then these users may receive targeted advertisements within their cable television broadcast streams for products or services more likely to appeal to those categories of users.

Similarly, a web server 220 or other computing device providing content to a user via the user's PC 211 or mobile device 212 may provide general advertisements to all users receiving certain information or using certain content, or may be provide targeted advertisements for specific users. For example, some web servers 220 may provide the same Internet advertisement (e.g., pop up ad, banner ad, hover ad, etc.) to every user visiting a specific web page. Web servers for other content providers, such as online retailers and web search engines, may track user's browsing histories (e.g., previous purchases, previous searches, pages visited, etc.) and may select custom Internet advertisements for users based on the user's browsing histories. In certain embodiments, an advertisement engine configured to select advertisements for users may be operated as a separate entity from the content provider or information distribution network. For example, a content provider (e.g., cable headend server 103, web server 220, etc.) may identify advertisement insertion opportunities within the content to be presented, and then may contact a separate advertising decision engine server configured to determine and/or provide the specific advertisement(s) to be presented during the advertisement insertion opportunities.

In step 310, a user interface associated with the electronic advertisement may be presented to allow the user to provide feedback regarding the advertisement. Advertisement feedback user interfaces may be presented on a number of different user devices, such as televisions (or other display devices), remote controls having display screens, PCs, tablet computers, mobile devices, etc. The design of an advertisement feedback user interface, and the techniques by which users provide feedback, may be different for different devices and over different communication media. For example, an advertisement feedback user interface for a television commercial may be rendered by a set-top box directly onto a television screen while the commercial is showing, and the user interface may allow users to input feedback via a remote control device or other input device (e.g., wireless keyboard, game controller, etc.) connected directly or indirectly to the user's television 112 or set-top box 113. In the context of television broadcasts, VOD, or other digital information transmissions, various technologies such as EBIF, OPENTV, TRU2WAY, RFI, and DVB-MHP may be used to transmit the user's feedback and related data back to the cable headend server or other content provider.

In the context of Internet-based advertisements or other software-based advertisements (including interactive television), an advertisement feedback user interface may be rendered on the same display screen (e.g., PC monitor, tablet display screen, mobile device touchscreen, etc.) on which the advertisement is being displayed, and the user interface may allow users to input feedback via the input devices available on these respective computing devices (e.g., keyboard, mouse, touch screen, voice control, etc.). Various network protocols such as TCP/IP, Ethernet, FTP, HTTP, and relating networking technologies may be used to transmit the user's feedback and related data back to a web server, content server, application server, or other content provider. Interactive television technologies may be used to achieve the same effect on television. Additionally, second screen technologies using tablet computers and other mobile devices may be used in conjunction with television viewing to solicit input from the viewer.

The advertisement feedback user interface provided in step 310 may be provided by the advertisers themselves and may be integrated directly into the advertisements. For example, a television commercial or Internet advertisement may be designed with a dedicated portion of the advertising screen that is used to elicit feedback from users regarding the advertisement. In such cases, the user feedback portion of the advertising screen may be visible and/or active throughout the advertisement, or alternatively may be visible and active only at or near the end of the advertisement.

In other examples, the advertisement feedback user interface may be provided by a different entity, over a different communication medium, on a different device, and/or using different presentation techniques from those used to present the advertisement itself. Thus, advertisers, advertisement decision engines, and other content providers need not provide (or even be aware of) the advertisement feedback user interface in some examples. For instance, a separate user feedback software application or other component executing within an STB 113, PC 114, mobile device 116, or other computing device, may be configured to detect when an advertisement is being displayed on an associated display device (e.g., television, PC, tablet, mobile device, etc.), and in response, may generate and display a user interface to collect feedback associated with the advertisement being displayed. The synchronization between the associated display device and the primary one may be done by direct wireless signaling between the devices, or by timer (e.g., an application on the associated display device may be started when the main program starts), or by any other desired technique used for synchronizing content between a main screen and a second screen. In some examples, a separate user feedback software application may be configured to overlay an advertisement feedback user interface directly on top of an advertisement, on the same display at the same time that the advertisement is being presented to the user.

Alternatively, the advertisement feedback user interface need not be displayed at the same time, on the same display device, and/or presented via the same medium, as the associated advertisement. For instance, the advertisement feedback user interface provided in step 310 may be presented to users sometime after the presentation of the electronic advertisement in step 305. When series of advertisements is presented to a user in a group or at a similar time (e.g., television commercials, Internet advertisements, etc.), the advertisement feedback user interface may be provided at the end of the user's session (e.g., television viewing session, web browsing session, etc.) to allow the user to rate, rank, or otherwise provide feedback for several advertisements at the same time. Other advertisement feedback user interfaces may be provided at predetermined times during a user's session (e.g., at the end of each commercial break or each program), or periodically (e.g., every 10 minutes, 30 minutes, hour, etc.) during the user's content viewing or interaction session. Thus, the advertisement feedback user interface need not be provided concurrently in time with the advertisements themselves.

Advertisement feedback user interfaces also may be provided over different communication media and/or different devices from the media and devices used to present the advertisements. For example, when an advertisement is presented via the user's television (e.g., during video multicast transmission or VOD programming), or via the user's PC or tablet computer (e.g., during web browsing or software application interaction), the advertisement feedback user interface for those advertisements may be presented on a separate device, such as the user's mobile device. Such user interfaces may be providing using an advertisement feedback application executing on a user's mobile device 116, tablet computer 115, PC 114, STB 113, or other device, which is configured to collect feedback for advertisements presented on different devices and/or through different communication channels. For example, an advertisement feedback application executing on a user's mobile device 116 may be configured to receive indications, via a LAN, WAN, or wireless network, that an advertisement is currently being presented (or was recently presented) to the user on a different device (e.g., TV 112, PC 114). Such indications may be transmitted from one of the components responsible for presenting the advertisement to the user (e.g., gateway 111, STB 113, PC 114, etc.), or may be transmitted from an advertising source (e.g., local office 103, web server 220, etc.) to the device executing the advertisement feedback application. The advertisement feedback application may receive the indication and prompt the user with a visual, auditory, or tactile cue (e.g., vibration) to provide feedback on the advertisement via a user interface.

In certain examples, an advertisement feedback application one on device may receive an indication that an advertisement is currently being presented (or was recently presented) to the user on a different device, and may design and present advertisement feedback user interfaces based on the received indications. Such an indication sent to the advertisement feedback application may include basic information regarding the advertisement, such as the device on which the advertisement is being (or was) presented, the time the advertisement was presented, the title of the advertisement, the product name(s) or company name(s) associated with the advertisement, and other information further identifying the advertisement (e.g., the television channel and/or program, the web page and/or web site, or the software application within which the advertisement was presented). Using this information, the advertisement feedback application may create and render a user interface that identifies the specific advertisements for the user, and allows the user to input feedback on those advertisements.

Advertisement feedback applications also may receive custom user interface data or components associated with specific advertisements. For example, an advertisement presentation device (e.g., STB 113, PC 114) or content provider (e.g., local office 103, web server 220) may provide a user interface, user interface components, or questions to an advertisement feedback application to be presented to the user, thereby allowing advertisers to receive custom feedback on specific advertisements. For instance, a first advertiser or advertisement decision engine may be only interested in whether the user liked or disliked an advertisement, and may transmit instructions to the advertisement feedback application that the feedback user interface should include only a single "Like Ad" or "Dislike Ad" button. A second advertiser or advertisement decision engine may desire more detailed feedback, and may transmit instructions to the advertisement feedback application to display multiple user interface components, allowing the user to provide more detailed feedback such as rating different portions of advertisement (e.g., beginning, middle, and end), different characters within the advertisement, and different measurements of the effectiveness of the advertisement. As another example, an advertiser (e.g., for a political candidate or issue) may be interested in having viewer answer specific questions, and may transmit certain instructions or an entire user interface to the advertisement feedback application so that the user is asked specific questions (e.g., "Does this ad make you more likely to vote for Candidate X?" and "Why or why not?").

As discussed above, an advertisement feedback application may execute on the same device that the advertisement is presented or on a different device. In either case, the advertisement feedback application need not receive any information about the advertisements, and need not even receive an indication that an advertisement is being (or was recently) presented to the user. For example, a user may initiate an advertisement feedback process for an advertisement by opening an advertisement feedback application installed on the user's mobile device or other computing device. In this example, the user may input information identifying the device, medium, channel, and/or time on which the advertisement was presented to the user, and then may provide feedback regarding the advertisement. For instance, the user may provide feedback on a television or VOD advertisement by inputting one or more of the television channel, program, advertisement time, or product, etc., so that the advertisement for which the user is providing feedback can be determined at a later time by the cable server 106, advertiser, or advertisement decision engine. Similarly, for providing feedback on an Internet advertisement, a user may provide the web site and/or web pages visited, the advertisement type, time, product or company name, etc., so that the Internet advertisement can be identified later by the web server 220, advertiser, or advertisement decision engine. In these examples, advertisement feedback applications may be configured to automatically detect and store certain information, such as the time and location of the user when the application is initiated and/or when the user inputs the advertisement feedback. Such applications also may be configured to record images, video, and/or sound from an advertisement. This information may be transmitted with the advertisement feedback provided by the user, and other information, to more effectively identify the specific advertisement on which the user is providing feedback. For instance, it may be possible for a back end server (e.g., cable server 106, web server 220, or other device associated with the information distribution network or advertiser) to identify the specific advertisement associated with the user's feedback based on the time, location, sound, image, and/or video data collected while the user was inputting the feedback, thus not requiring any additional input from the user to identify the specific advertisement.

Figure 4A:
FIGS. 4A-4C illustrate example user interfaces though which user feedback regarding electronic advertisements may be received, according to one or more aspects described herein.
Figure 4B:
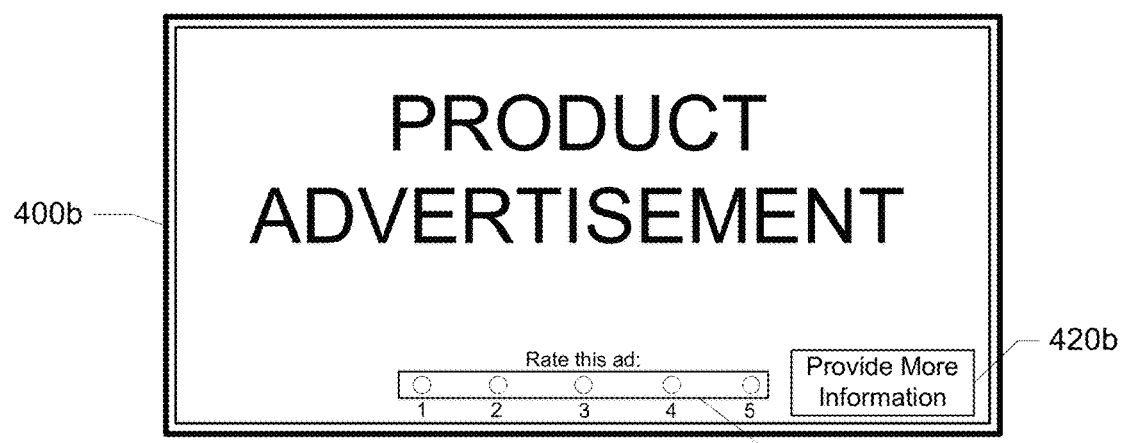
Figure 4C:

Referring now to FIGS. 4A-4C, three examples are shown of advertisement feedback user interfaces that may be provided to a user in step 310. In FIG. 4A, the advertisement feedback user interface 400a includes a single button 410a that states, "Don't Show Me This Ad Again." A user may select button 410a to indicate that the user does not like this product advertisement and would not like to see the same (or similar) advertisements in the future. Button 410a may be selected using an appropriate input device configured to communicate with the device on which the advertisement 400a is presented, for example, a remote control or game controller (e.g., for television-based advertisements), a mouse or keyboard (e.g., for PC-based advertisements), or a touch screen or stylus (e.g., for tablet or mobile device-base advertisements). As discussed above, the button 410a may be integrated within the advertisement 400a by the advertiser or advertisement provider (e.g., cable server 106, web server 220), or may be overlaid onto the advertisement 400a by a separate application executing on the user's TV 112 or STB 113 (e.g., for television-based advertisements), or on executing the user's PC 114, tablet computer 115, or mobile device 116 (e.g., for computer-based advertisements).

In FIG. 4B, the advertisement feedback user interface includes additional user interface components 410b and 420b. As in the above example, components 410b and 420b may be integrated within the advertisement 400b, or may be provided by a separate application executing on one of the devices providing the advertisement 400b. In this example, the advertisement feedback user interface includes a rating bar 410b that allows the user to rate the advertisement 400b on a numeric scale from 1 to 5. The user also has the option of providing additional feedback by selecting button 420b, which may open a text input area or may direct the user to a different user interface screen to allow the user to input more detailed feedback regarding the advertisement.

In other examples, other types of user interface components may be provided, such as rating sliders, drop downs, checkboxes, and various custom components. In some embodiments, user interface components may be provided to allow users to rate different elements or portions of the advertisement, such as the beginning, middle, and end of an advertisement, or rating different lines, different slogans, different characters, and/or different products appearing within an advertisement. In such cases, the user interface components may allow the user to provide feedback at different portions of the advertisement, or ongoing feedback throughout the advertisement. For instance, real-time voting and polling components may be used to track the user's rating or level of interest throughout the advertisement.

The advertisement feedback user interface components also may be customized based on the capabilities of the display device presenting the advertisement (e.g., television, PC, tablet computer, mobile device, etc.), and based on the associated input devices available to the user to provide feedback (e.g., keyboards, mice, remote controls, touchscreens, etc.).

In FIG. 4C, an advertisement 400c and an advertisement feedback user interface 410c are presented on separate user devices. For example, as described above, an advertisement 400c may be presented on a television 112 (e.g., a television commercial within linear programming or VOD), or on a computing device (e.g., an Internet advertisement during a web browsing session, or by a standalone application or other software component, etc.) such as a PC 114, tablet computer 115, or other device. In this example, the advertisement feedback user interface 410c is presented on a separate device, such as the user's mobile device 116. As described above, the user interface 410c may be rendered by an advertisement feedback application running on the user's mobile device 116. The advertisement feedback application may be initiated by one of the devices presenting the advertisement (e.g., STB 113 or PC 114), by a back end device (e.g., cable server 106 or web server 220), or by the user. The user interface provided by the advertisement feedback application in this example may be customized based on the capabilities of the device executing the application. As described above, the feedback user interface 410c also may be customized based the specific advertisement 400c, or may be a generic advertisement feedback user interface applicable to many different advertisements.

Returning to FIG. 3, in step 315, advertisement user feedback from the user interface components provided in step 310 may be received and stored. As described above, advertisement feedback user interfaces may be provided by a number of different devices, over different communication mediums, and at different times. Accordingly, the advertisement user feedback data may be initially received and stored by the device providing the user interface, or by another target device to which the user interface components are configured to transmit data. For example, an advertisement feedback application executing on a user's mobile device 116 may be configured to receive advertisement user feedback data and transmit the data to an associated device, such as the user's STB 113 or PC 114. The advertisement user feedback data also may be transmitted to and stored on one or more back end devices, such as cable servers 106, web servers 220, or other computing devices.

The advertisement feedback data received and stored in step 315 may correspond to the user interface provided in step 310. That is, if the user interface included a numeric advertising rating component and a text input component, then the data received in step 315 may contain the corresponding numeric and text feedback data. In addition to the user's feedback, the data received and stored in step 315 may include data identifying the specific advertisement(s) associated with the user's feedback. If the user interface provided in step 310 was closely integrated within the advertisement, then the data identifying the specific advertisement may be provided with the user feedback. For example, if the feedback user interface is designed and integrated directly into the advertisement by the advertiser, than the user interface components may be configured to transmit a specific advertisement identifier with the user's feedback. In other cases, if the advertisement feedback user interface is provided by a different entity and/or is not closely integrated within the advertisement, then a specific advertisement identifier might not be available. In such cases, the data identifying the specific advertisement(s) may include, for example, the device, the transmission medium, the channel (or program), the website, and/or the time associated with the presentation of the advertisement, along with other information that may allow the advertisement to be identified without a specific advertisement identifier. For example, an advertisement feedback application or user interface may be provided by a separate entity within the information distribution network, but may collect and use the available contextual information (e.g., a television channel and time, a VOD program, a website address and time, a website address and screen location, etc.) associated with the user's feedback to determine the advertisement for which the user has provided feedback.

In addition to data identifying the advertisement(s), and the user's feedback regarding these advertisements, other data may be received and stored in step 315, for example, user (or viewer) identifiers, device identifiers, and advertisement viewing times. User identifiers may allow the computing device(s) receiving the advertisement user feedback to identify the specific user that provided the feedback, in cases when the advertisement feedback user interface was presented to multiple users at the same premises 102 and/or on same devices. For example, different users in a household 102a might provide different ratings or feedback for the same advertisement. Therefore, the specific user inputting the feedback may be identified, for example, using additional components within the user interface (e.g., a name selector or dropdown), or by pre-associating specific devices and/or usage times with specific users. For instance, in an household 102a, a first television 112, a first mobile device 116, and all daytime usage of a PC 114 may be associated with one family member, whereas a second television 112, a second mobile device 116, a table computer 11, and all evening usage of the PC 114 may be associated with a second family member. Additionally, two different users watching the same television program at the same time may use different devices to provide their respective feedback on the same advertisement. For example, one user may use the remote control to provide advertisement feedback via the set-top box, while the other user may use an advertisement feedback application on the user's mobile device 116, or both users may use their respective mobile devices.

Device identifiers and/or advertisement viewing times associated with the user's advertisement feedback also may be retrieved and stored in 315. For example, a user's rating and feedback regarding an advertisement may depend in part on the device on which the advertisement is presented. Certain advertisements may be better suited to specific types of displays (e.g., display size, high definition or standard definition, 3D, etc.), transmission media, and/or viewing locations within a premises 102a. Additionally, certain advertisements may be better received at specific times of the day, week, etc. In some media, such as television video multicast transmission, advertisers may control the transmission time of an advertisement during a broadcast/multicast. However, the advertisement may be viewed at a different time, for example, when users store the content locally (e.g., within an STB 113, PC 114, or tablet computer 115) for later viewing. Additionally, in other media, such as web browsing and other software-based viewing content, advertisers may have less control (or no control) over the timing of when advertisements will be viewed by users. Accordingly, when receiving and processing a user's feedback regarding an advertisement, it may be useful for an advertisement decision engine or other device to know the time, location and/or device on which the advertisement was presented to the user.

Figure 5:
FIG. 5 is an example table containing data corresponding to user feedback for a set of advertisements, according to one or more aspects described herein.

Referring now to FIG. 5, an example table 500 is shown containing data representing user feedback and related data that may be received and stored for a set of advertisements presented to a user. The data in example table 500 may correspond to the data received and stored in step 315 for a single user, Customer 1, over a period of time. In this example, the advertisement feedback data received and stored includes an advertisement identifier ("Ad ID"), a product or service name associated with the advertisement ("Product"), the date and time when the advertisement was presented to the user ("Date/Time"), the communication medium over which the advertisement was presented ("Medium"), a device identifier corresponding to the device on which the user viewed the advertisement ("Device"), and the user's numeric rating of the advertisement on a scale of 1 to 10 ("Rating").

As described above, certain data from example table 500 may be directly received via the user interface components, while other data may be determined by the user's devices and back end devices responsible for presenting the advertisement to the user and receiving the user's feedback. For example, in certain cases an advertisement identifier and/or product name might not be known to any of the user's devices (e.g., 112-116) or even to the back end devices providing the advertisement (e.g., content server 106, web server 220). In such cases, additional information may be retrieved from other data sources, such as an external server of an advertiser or advertisement decision engine. For instance, the advertisement identifier and product name in this example may be retrieved from one or more data tables stored at a back end device, content provider, and/or advertiser server, using data such as the user's subscriber or connection data (e.g., subscriber identifier, IP address), the television channel, VOD transmission, or web address associated with the advertisement, and/or the transmission or presentation time of the advertisement.

It should be understood that example table 500 is illustrative only, and many other examples of advertisement feedback and related data may be used within the scope of the disclosure. For instance, although example table 500 includes only a single "Rating" column for the user's advertisement feedback, many different types of advertisement feedback may be received, including customized feedback for specific advertisements. Additional types of advertisement feedback data that may be collected for future analysis include data regarding the user's content viewing session (e.g., length of television viewing session or web browsing session), the physical location of the user at the time the advertisement was presented, the number (and relationships) of other people viewing the advertisement with the user, etc.

Referring again to FIG. 3, in step 320, the user advertisement feedback and related data received and stored in step 315 may be provided to one or more advertisement decision engines. The advertisement decision engine may be any computing device or system configured to determine or select an advertisement for presentation to a specific user or set of users. Advertisement decision engines may be implemented using hardware and/or software at various levels of an information distribution network (e.g., 100 or 200). For example, an advertisement decision engine may be implemented at an external advertisement server or other advertising content data source. Advertisement decision engines also may be implemented at back end content providers (e.g., central offices 103 and web servers 220), at intermediate devices (e.g., local offices 103 and intermediate cache devices), or at local devices operating at the user's premises 102 (e.g., STBs 113 and PCs 114). As described below in reference to FIG. 6, the advertisement feedback data and related data may be used by one or more advertisement decision engines within an information distribution network (e.g., 100 or 200) to customize future advertisement determination for users based on their previous advertisement feedback.

Figure 6:
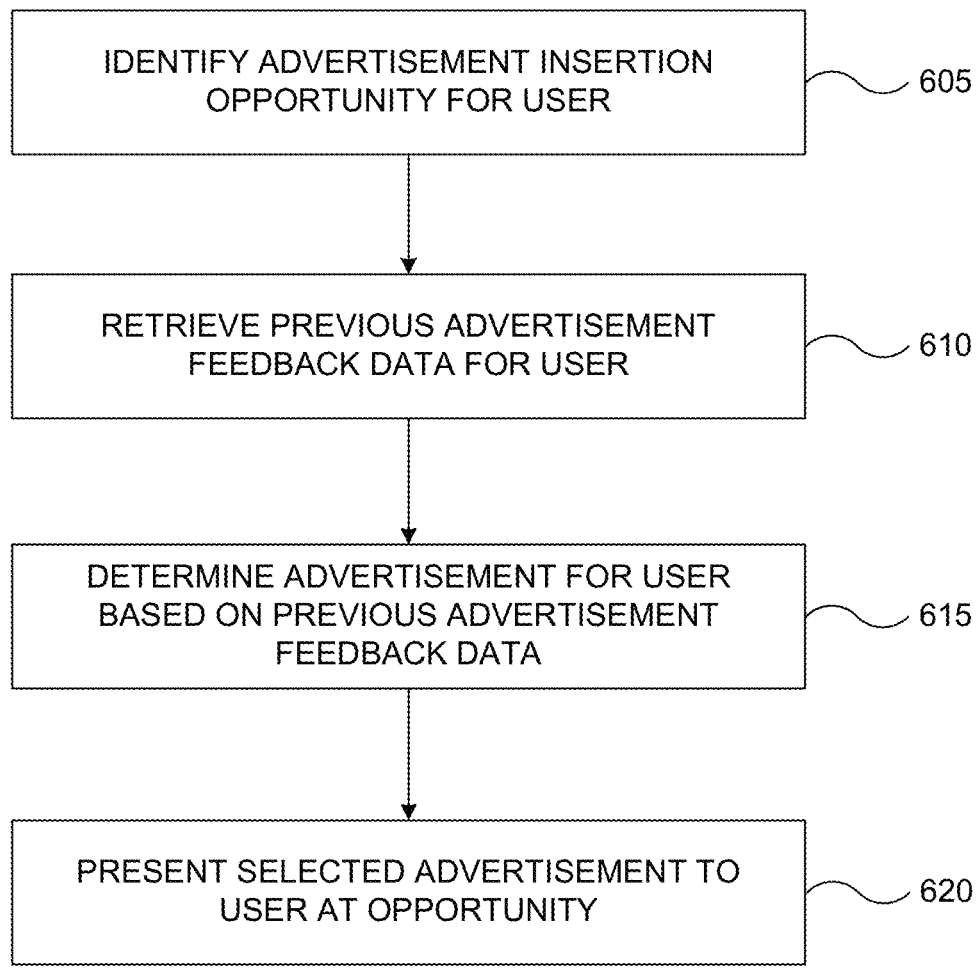
FIG. 6 is a flow diagram illustrating an example advertisement determination and presentation process, according to one or more aspects of the disclosure.

Referring now to FIG. 6, a flow diagram is shown illustrating an example process of determining and selecting an electronic advertisement for a user based on previous advertisement feedback and related data associated with the user.

In step 605, an advertisement decision engine may identify an advertisement insertion opportunity associated with a user or set of users. Advertisement insertion opportunities may be identified differently within different communication media and on different devices. For example, digital information transmitted from a server 103 (e.g., a video multicast transmission or VOD program) may follow one or more standards for digital program insertion, such as the SCTE-130 specification. Under SCTE-130 and similar specifications, a digital transmission stream may include markers indicating available splice points. An advertisement decision engine may be used to identify upcoming markers within the digital transmission, and an advertisement splicer may be used to insert advertisements into the digital transmission stream at the splice points. SCTE-130 and related technologies may allow digital information providers to insert different advertisements for different users at the same splice point within a digital transmission, so that one user (or set of users) receives a first advertisement while a second user (or set of users) receives a different second advertisement.

Different processes and technologies may be used to identify advertisement insertion opportunities within the context of Internet-based advertisements or other software-based advertisements. For example, during a web browsing session a user may navigate to a web page capable of presenting one or more Internet advertisements (e.g., pop-up ads, banner ads, hover ads, etc.) along with the content of the requested web page. Another form of Internet-based advertisements occurs when a web site customizes the content of a requested web page based on payment from advertisers. For instance, web sites such as search engines and online retailers may customize search results or product suggestions based on fees paid by advertisers. Other software programs running on a user's device (e.g., PC 114, tablet computer 115, or mobile device 116), such as games and mobile applications, also may include various advertisement insertion opportunities (e.g., advertising banners, product placement, splash screens, and pop up advertisements). As another example, digital billboards and other advertising media may be customized based on the detection of specific users in the proximity of the billboard or other advertisement. Biometric scanning and/or wireless communication between an electronic advertisement and a user's mobile device 116 may be used to identify the user and customize the electronic advertisement based on the user's identity.

For such Internet-based advertisements or software-based advertisements, a web server, application server, installed application software, or other content provider may detect opportunities for inserting Internet-based advertisements or other software-based advertisements based on the user's actions as described above. In these cases, specific advertisements may be selected for a user based on the user's web browsing history, previous purchases, demographics, and any other information available to the content provider. Various technologies such as GOOGLE ADWORDS and DOUBLECLICK FOR ADVERTISERS (DFA) may be used to collect user information for customizing Internet-based advertisements.

As described above, advertisement decision engines may be implemented within various information distribution networks (e.g., 100 and 200), for example, cable header servers 103, web servers 220, etc. Advertisement decision engines also may be implemented outside of the information distribution network by an advertiser or an external third-party system. For instance, an advertisement decision engine service may be provided by an external server configured to receive requests from various content providers (e.g., cable headends, web servers, etc.), and to respond by selecting electronic advertisements for the content providers to present to their users. Thus, a single advertisement decision engine may determine advertisements presented to users over multiple different communication media (e.g., cable, Internet, etc.), rather than being tied to a single specific advertising media. For such advertisement decision engines, an advertisement insertion opportunity may correspond to request from one or more separate content providers, rather than a first-hand detection of advertisement insertion opportunity within a user's broadcast/multicast transmission stream, web pages requests, etc.

In step 610, a set of advertisement feedback data may be retrieved for one or more users. For example, an advertisement decision engine may retrieve a set of previously stored advertisement feedback data for a user in response to the detection of an advertisement insertion opportunity for that user in step 605. In other cases, the retrieval of advertisement feedback data in step 610 need not be performed in response to a detection of an advertisement insertion opportunity, but may be done periodically and/or in anticipation of future advertisement insertion opportunities for the user. Retrieving advertisement feedback data may include querying one or more feedback databases stored within various levels of information distribution networks (e.g., 100 and 200), at advertisement decision engines, and/or within other data sources. Example table 500, shown in FIG. 5, includes an illustrative data set corresponding to advertisement feedback data and related data based on a set of advertisements presented to a single user ("Customer 1"). Table 500 provides an example of certain types of advertisement feedback data that may retrieved in step 610, however, example table 500 is illustrative only, and many other examples of advertisement feedback and related data may be retrieved in step 610.

Although table 500 provides examples of advertisement feedback data corresponding to specific advertisements, feedback data may also be captured corresponding to types of advertisements, products, or groups of products. In some examples, in addition to (or instead of) rating a specific advertisement, a user may indicate that they want or do not want to see advertisements in the future for the same type of product in the advertisement. For instance, a user may indicate they do not want to receive any advertisements for alcoholic beverages on any device in their home, while another user may indicate that they would like to receive advertisements on their personal devices for any new restaurants and bars that have recently opened in the same geographic area. User interests and disinterests in products and types of products also may be captured through surveys.

The advertisement feedback data retrieved in step 610 may correspond to feedback data for a single user (as shown in FIG. 5) or for a set of users, such as a plurality of users associated with a single premises 102a, or multiple premises 102 connected to the same local office 103. For example, if the advertisement insertion opportunity identified in step 605 relates to multiple different users, then advertisement feedback data may be retrieved in step 610 for all of those users for which data is available. To illustrate, a server 103 may detect an upcoming advertisement insertion opportunity within a video multicast transmission stream for a household 102a, but the server 103 might not know which users at the household 102a will be watching television at that time. Accordingly, in step 610, the advertisement decision engine may retrieve feedback data for all users within the household 102a in order to select the advertisement to be presented. Similarly, if an advertisement insertion opportunity corresponds to an Internet-based advertisement to be presented on a PC 114 (or other computing device) used by multiple users at a household, workplace, or other premises, then the advertisement decision engine may retrieve feedback data for each of the users in order to select the advertisement. As another example, if an advertisement insertion opportunity corresponds to an electronic advertisement to be presented in a public location (e.g., via a television or electronic billboard in a store or restaurant), the advertisement decision engine first may identify a set of users in the proximity of the location where the advertisement will be presented, for example, using biometric scanning and/or wireless communication with the user's mobile devices, and then may retrieve feedback data for each of the users in order to select the advertisement.

When an advertisement insertion opportunity potentially relates to multiple different users, as in the examples described above, the advertisement decision engine may retrieve feedback data for all potential viewers of the upcoming advertisement, or may identify one or more of the users as the most likely viewers of the upcoming advertisement. For example, the most likely viewers of an upcoming advertisement inserted into the video multicast or broadcast transmission stream for a household 102a may be identified based on the current time or date, the channel or program being viewed, and/or the specific device within the household 102a on which the advertisement will be presented. In such cases, the advertisement decision engine may retrieve advertisement feedback data in step 610 only for the user or users determined to be the most likely viewers of the upcoming advertisement. Alternatively, the advertisement decision engine may retrieve feedback data in step 610 for all of the potential viewers, but may weight the feedback data in favor of the most likely viewers.

In step 615, the advertisement decision engine may determine the advertisement to be presented to the user or users at the advertisement insertion opportunity, based on the advertisement feedback data retrieved in step 610. Thus, the advertisement decision engine may customize the upcoming advertisement selections for users based on the previous advertisement feedback received from those users. For example, if a user previously indicated that they did not wish to see a particular advertisement again (e.g., using button 410a or other feedback component), then the advertising decision engine may select different advertisements for the same product, or advertisements for different products and types of products, rather than presenting the same (or a similar) advertisement to the user. Similarly, if a user previously provided a high rating for an advertisement (e.g., using rating bar 410b or other feedback component), then the advertising decision engine may select the same or similar advertisements for the same product, same product line, or similar types of products, to present to the user. In some cases, the advertising decision engine may override previous advertisement feedback data received from the user. For example, an advertisement may be selected even though the user has provided feedback that they are not interested in seeing the advertisement or type of advertisement, or an advertisement might not be selected even though the user has provided feedback that they are interested in seeing the advertisement, etc. Such decisions to consider and/or override user advertisement feedback data may be made by advertisers and/or advertising decision engines based on a variety of factors, including the priority or cost of the advertising campaign, and the weight of the user's previous feedback (e.g., strongly liked or strongly disliked advertisements).

Many different types of advertisement determinations may be performed in step 615, depending on the advertisement feedback data retrieved in step 610 and the various data analysis techniques used. For example, referring to the example table 500 shown in FIG. 5, advertisement feedback data is shown corresponding to three different products, Product ABC, Product DEF, and Product XYZ. Each product may have multiple different advertisements associated with the product, and example table 500 also includes date/time data, device and medium data, and the user's numeric rating for each advertisement. As the examples below illustrate, the advertisement determinations in step 615 may be based on the user's feedback as well as various types of additional data.

In example table 500, shown in FIG. 5, Product ABC has a single associated advertisement, Ad ID 2165. In this example, the user provided a relatively high rating for this advertisement the first time it was presented to the user (see row 501). However, the subsequent lower ratings for this advertisement may indicate that the user become burned out on this advertisement after seeing it multiple times in quick succession (see rows 503, 504, and 509). The final rating for this advertisement in example table 500 shows a slightly increase in rating, which may indicate that after several days without seeing the advertisement, the user is not as burned out and has regained some appreciation of the advertisement (see row 515). Accordingly, based on the sample feedback data for Product ABC, the advertisement decision engine in step 615 may select this advertisement and similar advertisements on a periodic basis, in order to avoid viewers becoming burned out and irritated by overexposure to such advertisements.

Product DEF in example table 500 has three associated advertisements, Ad IDs 4199, 4202, and 4206. In this example, the user provided relatively high advertisement ratings for two of the advertisements for Product DEF, Ad IDs 4199 and 4206 (see rows 502, 508, 510, and 512), but lower ratings for the other Product DEF advertisement, Ad ID 4202 (see rows 506 and 513). Based on this sample feedback data, in step 615 the advertisement decision engine may select these higher rated advertisements to be presented to the user for Product DEF over the lower rated advertisement. Additionally, when selecting upcoming advertisements to be presented to the user for other products, the advertisement decision engine may select advertisements having similar characteristics to the higher rated advertisements (e.g., similar themes, styles, actors, etc.) rather than advertisements having similar characteristics to the lower rated advertisement.

Product XYZ in example table 500 has three associated advertisements, Ad IDs 776, 778, and 784. In this example, the user provided relatively low advertisement ratings for all advertisements for Product XYZ, regardless of which specific advertisement was presented (see rows 505, 507, 511, 514, and 516). Based on this sample feedback data, in step 615 the advertisement decision engine may determine that the user is not likely to be receptive to any advertisement for Product XYZ or similar products. For example, Product XYZ may be in a product line or industry in which the user is not interested. Accordingly, in step 615, the advertisement decision engine may select advertisements for different products and types of products for upcoming advertisement insertion opportunities for the user.

In step 620, the advertisement determined in step 615 may be selected and presented to the user during the advertisement insertion opportunity identified in step 605. As discussed above, presenting the selected advertisement may correspond to splicing the selected advertisement into a video multicast transmission stream (e.g., television or VOD program) to be presented to the user. Presenting selected Internet-based or other software-based advertisements to users may correspond to transmitting advertisements during a web browsing session or customizing the user's requested web page (or other content) to include the selected advertisement. Various different techniques may be used to present selected advertisements in other advertising media (e.g., advertisements embedded within multicast/broadcast or satellite radio transmissions, software applications, digital billboards, etc.), depending on the capabilities of the presentation devices and infrastructure of the information distribution systems. Additionally, as discussed above, an advertisement decision engine need not be implemented within an information distribution network, but may be implemented outside of the information distribution network by an advertiser or other third-party system. For such advertisement decision engines, presenting a selecting advertisement in step 620 may correspond to responding to a request for an advertisement selection from one or more content providers or information distribution networks, rather than directly providing the selected advertisement to the user or users.

The methods, systems and other features described herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of the IC. Further, the IC may output image data to a display buffer.

Although specific examples of carrying out the features herein have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

The invention claimed is:

1. A method comprising:
sending, by a computing device, to a first user device associated with a user, and via a first communication medium, a first advertisement for output via the first user device;
sending, by the computing device, to a second user device that is associated with the first user device, and via a second communication medium, a signal to cause the second user device to output a feedback user interface, wherein the feedback user interface is customized based on display capabilities of the second user device;
receiving, by the computing device from the second user device, a first message indicating a first advertisement rating corresponding to the first advertisement, wherein the first message is based on a first input received via the feedback user interface;
receiving, by the computing device from the second user device, a second message indicating a second advertisement rating corresponding to the first advertisement, wherein the second message is based on a second input received via the feedback user interface; and
causing, by the computing device and based on the first advertisement rating and the second advertisement rating, the first user device to output the first advertisement again.

2. The method of claim 1, wherein the first advertisement rating and the second advertisement rating comprise advertisement ratings that were input by the user.

3. The method of claim 1, wherein the first advertisement rating comprises:
a first user rating corresponding to a first segment of the first advertisement; and
a second user rating corresponding to a second segment of the first advertisement.

4. The method of claim 1, wherein the first user device comprises a television, and wherein the second user device comprises a mobile device.

5. The method of claim 1, wherein the first user device comprises a personal computer, and wherein the second user device comprises a mobile device.

6. An apparatus comprising:
one or more processors; and
memory storing instructions that, when executed by the one or more processors, cause the apparatus to:
send, to a first user device associated with a user and via a first communication medium, an advertisement to be output via the first user device;
send, to a second user device that is associated with the first user device, and via a second communication medium, a signal to cause the second user device to output a feedback user interface associated with the advertisement, wherein the feedback user interface is customized based on display capabilities of the second user device;
receive, from the second user device, a first message indicating a first advertisement rating corresponding to the advertisement, wherein the first message is based on a first input received via the feedback user interface;
receive, from the second user device, a second message indicating a second advertisement rating corresponding to the advertisement, wherein the second message is based on a second input received via the feedback user interface; and cause, based on the first advertisement rating and the second advertisement rating, the first user device to output the advertisement again.

7. The apparatus of claim 6, wherein the first user device comprises a television, and wherein the second user device comprises a mobile device.

8. The method of claim 1, further comprising:
receiving a request for content, wherein the content indicates an available splice point for an insertion opportunity; and
causing, based on the insertion opportunity, an insertion of the first advertisement into the content.

9. The method of claim 1, further comprising receiving data indicating a plurality of times the first advertisement was consumed by the user, wherein the plurality of times corresponds to a plurality of advertisement ratings, and wherein the causing the first user device to output the first advertisement again is further based on the plurality of advertisement ratings.

10. The apparatus of claim 6, wherein the first advertisement rating comprises custom feedback describing the advertisement.

11. The apparatus of claim 6, wherein the first user device comprises a personal computer, and wherein the second user device comprises a mobile device.

12. The method of claim 1, wherein the first communication medium is wired and the second communication medium is wireless.

13. The method of claim 1, further comprising sending, based on a campaign priority of a second advertisement, the second advertisement.

14. The method of claim 1, wherein the sending the signal to cause the output of the feedback user interface comprises sending, by the computing device, to the second user device, and via the second communication medium, an instruction to output the feedback user interface via the second user device, wherein the instruction indicates the first advertisement and a time that the first advertisement was output via the first user device.

15. The method of claim 1, wherein the sending the signal to cause the output of the feedback user interface comprises sending, by the computing device, to the second user device, and via the second communication medium, an instruction to output the feedback user interface via the second user device, wherein the instruction indicates that the first advertisement is currently being output via the first user device.

16. A method comprising:
sending, by a computing device, to a first user device associated with a user, and via a first communication medium, an advertisement to be output via the first user device;
sending, to a second user device that is associated with the first user device, based on an output of the advertisement, and via a second communication medium, a signal to cause the second user device to output a feedback user interface, wherein the feedback user interface is customized based on display capabilities of the second user device;
receiving, by the computing device and from the second user device, a plurality of advertisement ratings for the advertisement, wherein the plurality of advertisement ratings is based on input received via the feedback user interface; and causing, by the computing device and based on the plurality of advertisement ratings, the first user device to output the advertisement again.

17. The method of claim 16, wherein the plurality of advertisement ratings respectively correspond to a plurality of times that the advertisement was output to the user, the method further comprising:
receiving, by the computing device and after the causing the first user device to output the advertisement again, a subsequent advertisement rating corresponding to a time subsequent to the plurality of times;
determining that the subsequent advertisement rating is higher than at least one of the plurality of advertisement ratings; and
causing, by the computing device and based on the determining that the subsequent advertisement rating is higher, the first user device to output the advertisement to the user again.

18. The method of claim 1, wherein the second advertisement rating was received by the second user device later than the first advertisement rating, and
wherein the causing the first user device to output the first advertisement again is further based on a determination that the second advertisement rating is higher than the first advertisement rating.

19. The method of claim 1, wherein the causing comprises causing the first user device to output the first advertisement at a first future time, and the method further comprises:
causing a third user device associated with the user to output the first advertisement at a second future time.

20. The method of claim 1, wherein the sending the first advertisement for output via the first user device comprises sending the first advertisement for output during a user session, and wherein the sending the signal comprises sending, after the user session, the signal to cause the second user device to output the feedback user interface after the user session.

21. The method of claim 1, further comprising:
sending, based on the first message and based on the second message, a second advertisement for output via the first user device.

22. The method of claim 1, further comprising:
causing, based on the first message and based on the second message, sending of the first advertisement for output via the first user device on a periodic basis.

23. The method of claim 1, further comprising:
permitting repeat presentations, to the user, of the first advertisement; and
based on received advertisement ratings from the user for the repeated presentations of the first advertisement, causing output of the first advertisement on a less frequent basis.

24. The method of claim 1, wherein the first advertisement corresponds to a product, and the method further comprising: causing, based on the first advertisement rating and the second advertisement rating, the first user device to output a second advertisement corresponding to the product.

25. The method of claim 1, further comprising: determining a product associated with the first advertisement; and
storing an association of the product, the first advertisement rating, and the second advertisement rating.

26. The method of claim 1, wherein the first advertisement rating comprises custom feedback describing the first advertisement.

27. The apparatus of claim 6, wherein the first advertisement rating and the second advertisement rating comprise advertisement ratings that were input by the user.

28. The apparatus of claim 6, wherein the first advertisement rating comprises:
   a first user rating corresponding to a first segment of the advertisement; and
   a second user rating corresponding to a second segment of the advertisement.

29. The apparatus of claim 6, wherein the instructions, when executed by the one or more processors, further cause the apparatus to:
   receive a request for content, wherein the content indicates an available splice point for an insertion opportunity; and
   cause, based on the insertion opportunity, an insertion of the advertisement into the content.

30. The apparatus of claim 6, wherein the instructions, when executed by the one or more processors, further cause the apparatus to:
   receiving data indicating a plurality of times the advertisement was consumed by the user, wherein the plurality of times corresponds to a plurality of advertisement ratings, and wherein the causing the first user device to output the advertisement again is further based on the plurality of advertisement ratings.

31. The apparatus of claim 6, wherein the first communication medium is wired and the second communication medium is wireless.

32. The apparatus of claim 6, wherein the instructions, when executed by the one or more processors, further cause the apparatus to:
   send, based on a campaign priority of a second advertisement, the second advertisement.

33. The apparatus of claim 6, wherein the instructions, when executed by the one or more processors, cause the apparatus to send the signal to cause the output of the feedback user interface by sending to the second user device, and via the second communication medium, an instruction to output the feedback user interface via the second user device, wherein the instruction indicates the advertisement and a time that the advertisement was output via the first user device.

34. The apparatus of claim 6, wherein the instructions, when executed by the one or more processors, cause the apparatus to send the signal to cause the output of the feedback user interface by sending to the second user device, and via the second communication medium, an instruction to output the feedback user interface via the second user device, wherein the instruction indicates that the advertisement is currently being output via the first user device.

35. The apparatus of claim 6, wherein the second advertisement rating was received by the second user device later than the first advertisement rating, and wherein the instructions, when executed by the one or more processors, cause the apparatus to:
   cause the first user device to output the advertisement again based on a determination that the second advertisement rating is higher than the first advertisement rating.

36. The apparatus of claim 6, wherein the instructions, when executed by the one or more processors, cause the apparatus to:
   cause the first user device to output the advertisement again by causing the first user device to output the advertisement at a first future time, and
   wherein the instructions, when executed by the one or more processors, further cause the apparatus to:
   cause a third user device associated with the user to output the advertisement at a second future time.

37. The apparatus of claim 6, wherein the instructions, when executed by the one or more processors, cause the apparatus to:
   send the advertisement for output via the first user device by sending the advertisement for output during a user session, and
   send the signal by sending, after the user session, the signal to cause the second user device to output the feedback user interface after the user session.

38. The apparatus of claim 6, wherein the instructions, when executed by the one or more processors, further cause the apparatus to:
   send, based on the first message and based on the second message, a second advertisement for output via the first user device.

39. The apparatus of claim 6, wherein the instructions, when executed by the one or more processors, further cause the apparatus to:
   cause, based on the first message and based on the second message, sending of the advertisement for output via the first user device on a periodic basis.

40. The apparatus of claim 6, wherein the instructions, when executed by the one or more processors, further cause the apparatus to:
   permit repeat presentations, to the user, of the advertisement; and
   based on received advertisement ratings from the user for the repeated presentations of the advertisement, cause output of the advertisement on a less frequent basis.

41. The apparatus of claim 6, wherein the first advertisement corresponds to a product, and the instructions, when executed by the one or more processors, further cause the apparatus to:
   cause, based on the first advertisement rating and the second advertisement rating, the first user device to output a second advertisement corresponding to the product.

42. The apparatus of claim 6, wherein the instructions, when executed by the one or more processors, further cause the apparatus to:
   determine a product associated with the advertisement; and
   store an association of the product, the first advertisement rating, and the second advertisement rating.

43. A non-transitory computer-readable medium storing instructions that, when executed, cause:
   sending, by a computing device, to a first user device associated with a user, and via a first communication medium, a first advertisement for output via the first user device;
   sending, by the computing device, to a second user device that is associated with the first user device, and via a second communication medium, a signal to cause the second user device to output a feedback user interface, wherein the feedback user interface is customized based on display capabilities of the second user device;
   receiving, by the computing device from the second user device, a first message indicating a first advertisement rating corresponding to the first advertisement, wherein the first message is based on a first input received via the feedback user interface;
   receiving, by the computing device from the second user device, a second message indicating a second advertisement rating corresponding to the first advertisement, wherein the second message is based on a second input received via the feedback user interface; and causing, by the computing device and based on the first advertisement rating and the second advertisement rating, the first-user device to output the first advertisement again.

44. The non-transitory computer-readable medium of claim 43, wherein the first advertisement rating and the second advertisement rating comprise advertisement ratings that were input by the user.

45. The non-transitory computer-readable medium of claim 43, wherein the first advertisement rating comprises:
   a first user rating corresponding to a first segment of the first advertisement; and
   a second user rating corresponding to a second segment of the first advertisement.

46. The non-transitory computer-readable medium of claim 43, wherein the first user device comprises a television, and wherein the second user device comprises a mobile device.

47. The non-transitory computer-readable medium of claim 43, wherein the first user device comprises a personal computer, and wherein the second user device comprises a mobile device.

48. The non-transitory computer-readable medium of claim 43, wherein the instructions, when executed, further cause:
   receiving a request for content, wherein the content indicates an available splice point for an insertion opportunity; and
   causing, based on the insertion opportunity, an insertion of the first advertisement into the content.

49. The non-transitory computer-readable medium of claim 43, wherein the instructions, when executed, further cause:
   receiving data indicating a plurality of times the first advertisement was consumed by the user, wherein the plurality of times corresponds to a plurality of advertisement ratings, and wherein the causing the first user device to output the first advertisement again is further based on the plurality of advertisement ratings.

50. The non-transitory computer-readable medium of claim 43, wherein the first advertisement rating comprises custom feedback describing the first advertisement.

51. The non-transitory computer-readable medium of claim 43, wherein the first communication medium is wired and the second communication medium is wireless.

52. The non-transitory computer-readable medium of claim 43, wherein the instructions, when executed, further cause:
   sending, based on a campaign priority of a second advertisement, the second advertisement.

53. The non-transitory computer-readable medium of claim 43, wherein the instructions, when executed, cause the sending the signal to cause the output of the feedback user interface by sending to the second user device, and via the second communication medium, an instruction to output the feedback user interface via the second user device, wherein the instruction indicates the first advertisement and a time that the first advertisement was output via the first user device.

54. The non-transitory computer-readable medium of claim 43, wherein the instructions, when executed, cause the sending the signal to cause the output of the feedback user interface by sending to the second user device, and via the second communication medium, an instruction to output the feedback user interface via the second user device, wherein the instruction indicates that the first advertisement is currently being output via the first user device.

55. The non-transitory computer-readable medium of claim 43, wherein the second advertisement rating was received by the second user device later than the first advertisement rating, and
   wherein the instructions, when executed, cause the first user device to output the first advertisement again based on a determination that the second advertisement rating is higher than the first advertisement rating.

56. The non-transitory computer-readable medium of claim 43, wherein the instructions, when executed, cause the first user device to output the first advertisement again by causing the first user device to output the first advertisement at a first future time, and wherein the instructions, when executed, further cause:
   causing a third user device associated with the user to output the first advertisement at a second future time.

57. The non-transitory computer-readable medium of claim 43, wherein the instructions, when executed, cause:
   sending the first advertisement for output via the first user device by sending the first advertisement for output during a user session, and
   sending the signal comprises sending, after the user session, the signal to cause the second user device to output the feedback user interface after the user session.

58. The non-transitory computer-readable medium of claim 43, wherein the instructions, when executed, further cause:
   sending, based on the first message and based on the second message, a second advertisement for output via the first user device.

59. The non-transitory computer-readable medium of claim 43, wherein the instructions, when executed, further cause:
   causing, based on the first message and based on the second message, sending of the first advertisement for output via the first user device on a periodic basis.

60. The non-transitory computer-readable medium of claim 43, wherein the instructions, when executed, further cause:
   permitting repeat presentations, to the user, of the first advertisement, and
   based on received advertisement ratings from the user for the repeated presentations of the first advertisement, causing output of the first advertisement on a less frequent basis.

61. The non-transitory computer-readable medium of claim 43, wherein the first advertisement corresponds to a product, and wherein the instructions, when executed, further cause:
   causing, based on the first advertisement rating and the second advertisement rating, the first user device to output a second advertisement corresponding to the product.

62. The non-transitory computer-readable medium of claim 43, wherein the instructions, when executed, further cause:
   determining a product associated with the first advertisement; and
   storing an association of the product, the first advertisement rating, and the second advertisement rating.

63. An apparatus comprising:
   one or more processors; and
   memory storing instructions that, when executed by the one or more processors, cause the apparatus to:
      send, to a first user device associated with a user, and via a first communication medium, an advertisement to be output via the first user device;

send, to a second user device that is associated with the first user device, based on an output of the advertisement, and via a second communication medium, a signal to cause the second user device to output a feedback user interface, wherein the feedback user interface is customized based on display capabilities of the second user device;

receive, from the second user device, a plurality of advertisement ratings for the advertisement, wherein the plurality of advertisement ratings is based on input received via the feedback user interface; and cause, based on the plurality of advertisement ratings, the first user device to output the advertisement again.

64. The apparatus of claim 63, wherein the plurality of advertisement ratings respectively correspond to a plurality of times that the advertisement was output to the user, and wherein the instructions, when executed by the one or more processors, further cause the apparatus to:

receive, after the causing the first user device to output the advertisement again, a subsequent advertisement rating corresponding to a time subsequent to the plurality of times;

determine that the subsequent advertisement rating is higher than at least one of the plurality of advertisement ratings; and cause, based on the determination that the subsequent advertisement rating is higher, the first user device to output the advertisement to the user again.

65. A non-transitory computer-readable medium storing instructions that, when executed, cause:

sending, to a first user device associated with a user, and via a first communication medium, an advertisement to be output via the first user device;

sending, to a second user device that is associated with the first user device, based on an output of the advertisement, and via a second communication medium, a signal to cause the second user device to output a feedback user interface, wherein the feedback user interface is customized based on display capabilities of the second user device;

receiving, from the second user device, a plurality of advertisement ratings for the advertisement, wherein the plurality of advertisement ratings is based on input received via the feedback user interface; and causing, based on the plurality of advertisement ratings, the first user device to output the advertisement again.

66. The non-transitory computer-readable medium of claim 65, wherein the plurality of advertisement ratings respectively correspond to a plurality of times that the advertisement was output to the user, and wherein the instructions, when executed, cause:

receiving, after the causing the first user device to output the advertisement again, a subsequent advertisement rating corresponding to a time subsequent to the plurality of times;

determining that the subsequent advertisement rating is higher than at least one of the plurality of advertisement ratings; and causing, based on the determining that the subsequent advertisement rating is higher, the first user device to output the advertisement to the user again.

\* \* \* \* \*

UNITED STATES PATENT AND TRADEMARK OFFICE
CERTIFICATE OF CORRECTION

| | |
|---|---|
| PATENT NO. | : 11,423,435 B2 |
| APPLICATION NO. | : 13/796291 |
| DATED | : August 23, 2022 |
| INVENTOR(S) | : Dan Holden |

It is certified that error appears in the above-identified patent and that said Letters Patent is hereby corrected as shown below:

In the Specification

Detailed Description, Column 4, Line 11:
Please delete "HTMLS," and insert --HTML5,--

Detailed Description, Column 13, Line 33:
Delete "table" and insert --tablet--

Detailed Description, Column 13, Line 33:
Delete "11," and insert --115,--

Signed and Sealed this
Seventeenth Day of October, 2023

Katherine Kelly Vidal
*Director of the United States Patent and Trademark Office*